(12) United States Patent
Russell et al.

(10) Patent No.: US 7,774,849 B2
(45) Date of Patent: Aug. 10, 2010

(54) METHODS, SYSTEMS, AND COMPUTER PROGRAM PRODUCTS FOR DETECTING AND MITIGATING DENIAL OF SERVICE ATTACKS IN A TELECOMMUNICATIONS SIGNALING NETWORK

(75) Inventors: Travis E. Russell, Clayton, NC (US); Peter J. Marsico, Chapel Hill, NC (US)

(73) Assignee: Tekelec, Morrisville, NC (US)

( * ) Notice: Subject to any disclaimer, the term of this patent is extended or adjusted under 35 U.S.C. 154(b) by 1119 days.

(21) Appl. No.: 11/107,413

(22) Filed: Apr. 15, 2005

(65) Prior Publication Data
US 2006/0236402 A1    Oct. 19, 2006

(51) Int. Cl.
*G01R 31/08* (2006.01)
(52) U.S. Cl. .......................... 726/25; 713/153; 726/11; 726/22; 726/23; 709/224
(58) Field of Classification Search ......... 370/229–236; 709/224–225, 233, 235, 239, 241; 713/152–154; 726/11–15, 22–23
See application file for complete search history.

(56) References Cited

U.S. PATENT DOCUMENTS

| | | | |
|---|---|---|---|
| 5,282,244 A | 1/1994 | Fuller et al. | |
| 5,579,372 A | 11/1996 | Åstrom | |
| 5,701,301 A | 12/1997 | Weisser, Jr. | |
| 5,768,509 A | 6/1998 | Gunluk | |
| 5,862,334 A | 1/1999 | Schwartz et al. | |
| 5,903,726 A | 5/1999 | Donovan et al. | |
| 5,930,239 A | 7/1999 | Turcotte | |
| 5,987,323 A | 11/1999 | Huotari | |
| 6,061,331 A * | 5/2000 | Conway et al. | 370/232 |
| 6,101,393 A | 8/2000 | Alperovich et al. | |
| 6,108,325 A | 8/2000 | Stephanson et al. | |
| 6,108,559 A | 8/2000 | Astrom et al. | |

(Continued)

FOREIGN PATENT DOCUMENTS

EP    1 377 909    11/2009

(Continued)

OTHER PUBLICATIONS

CCS#7 Networks Dependability Studies: Phase 2, Network Integrity Aspects and Qualification Techniques—Congestion Control and Failure Propagation, vol. 2 of 3: Annex A, Jul. 1998 (76 pages).

(Continued)

*Primary Examiner*—Kimyen Vu
*Assistant Examiner*—Darren Schwartz
(74) *Attorney, Agent, or Firm*—Jenkins, Wilson, Taylor & Hunt, P.A.

(57) ABSTRACT

Methods, systems, and computer program products for detecting and mitigating a denial of service attack in a telecommunications signaling network are provided. According to one method, traffic rate information is monitored on at least two of a plurality of signaling links. If the traffic rate on one of the signaling links exceeds the rate on at least another of the signaling links by a predetermined threshold, a denial of service attack is indicated. In response to indicating a denial of service attack, a user may take mitigating action, such as updating a firewall function to block packets associated with the offending source.

33 Claims, 3 Drawing Sheets

U.S. PATENT DOCUMENTS

| | | | |
|---|---|---|---|
| 6,125,281 | A | 9/2000 | Wells et al. |
| 6,167,129 | A | 12/2000 | Fikis et al. |
| 6,175,743 | B1 | 1/2001 | Alperovich et al. |
| 6,223,045 | B1 | 4/2001 | Valentine et al. |
| 6,233,045 | B1 | 5/2001 | Valentine et al. |
| 6,259,925 | B1 | 7/2001 | Josse |
| 6,289,223 | B1 | 9/2001 | Mukherjee et al. |
| 6,301,484 | B1 | 10/2001 | Rogers et al. |
| 6,308,276 | B1 | 10/2001 | Ashdown et al. |
| 6,347,374 | B1 | 2/2002 | Drake et al. |
| 6,400,942 | B1 | 6/2002 | Hansson et al. |
| 6,513,122 | B1 * | 1/2003 | Magdych et al. ............. 726/23 |
| 6,563,830 | B1 | 5/2003 | Gershon et al. |
| 6,789,203 | B1 | 9/2004 | Belissent |
| 6,795,708 | B1 | 9/2004 | Patel |
| 6,819,932 | B2 | 11/2004 | Allison et al. |
| 6,865,191 | B1 | 3/2005 | Bengtsson et al. |
| 7,043,000 | B2 | 5/2006 | Delaney et al. |
| 7,092,357 | B1 * | 8/2006 | Ye ............................. 370/230 |
| 7,145,875 | B2 | 12/2006 | Allison et al. |
| 7,237,267 | B2 | 6/2007 | Rayes et al. |
| 7,246,376 | B2 | 7/2007 | Moharram |
| 7,401,360 | B2 | 7/2008 | Ravishankar et al. |
| 2001/0005678 | A1 | 6/2001 | Lee |
| 2001/0006897 | A1 | 7/2001 | Kang et al. |
| 2001/0041579 | A1 | 11/2001 | Smith et al. |
| 2002/0035683 | A1 * | 3/2002 | Kaashoek et al. ........... 713/154 |
| 2002/0133586 | A1 | 9/2002 | Shanklin et al. |
| 2003/0084328 | A1 * | 5/2003 | Tarquini et al. ............. 713/200 |
| 2003/0145231 | A1 * | 7/2003 | Poletto et al. ............... 713/201 |
| 2003/0177389 | A1 | 9/2003 | Albert et al. |
| 2003/0202511 | A1 * | 10/2003 | Sreejith et al. .............. 370/389 |
| 2004/0015582 | A1 * | 1/2004 | Pruthi ........................ 709/224 |
| 2004/0042609 | A1 | 3/2004 | Delaney et al. |
| 2004/0049455 | A1 | 3/2004 | Mohsenzadeh |
| 2004/0054925 | A1 * | 3/2004 | Etheridge et al. ........... 713/201 |
| 2004/0064351 | A1 * | 4/2004 | Mikurak ........................ 705/7 |
| 2004/0093512 | A1 | 5/2004 | Sample |
| 2004/0093513 | A1 | 5/2004 | Cantrell et al. |
| 2004/0111843 | A1 | 6/2004 | Framer |
| 2004/0114741 | A1 | 6/2004 | Ngo et al. |
| 2004/0233851 | A1 | 11/2004 | Baldwin et al. |
| 2005/0278620 | A1 | 12/2005 | Baldwin et al. |
| 2006/0095970 | A1 | 5/2006 | Rajagopal et al. |
| 2006/0107318 | A1 * | 5/2006 | Jeffries et al. ................ 726/22 |
| 2007/0220256 | A1 | 9/2007 | Yasui et al. |

FOREIGN PATENT DOCUMENTS

| | | |
|---|---|---|
| WO | WO 99/27726 A | 6/1999 |
| WO | WO 99/37066 A | 7/1999 |
| WO | WO 02/071234 A1 | 9/2002 |
| WO | WO 2004/023775 A2 | 3/2004 |

OTHER PUBLICATIONS

Communication Pursuant to Article 94(3) EPC for European Application No. 02748368.4 (Oct. 9, 2008).
Supplementary European Search Report for European Application No. 02748368.4 (Jun. 24, 2008).
Notice of Allowance and Fee(s) Due for U.S. Appl. No. 10/308,316 (Apr. 14, 2008).
Non-Final Office Action for U.S. Appl. No. 10/308,316 (Oct. 31, 2007).
Notice of Panel Decision from Pre-Appeal Brief Review for U.S. Appl. No. 10/308,316 (Aug. 24, 2007).
Advisory Action for U.S. Appl. No. 10/308,316 (May 25, 2007).
Notification of Transmittal of International Preliminary Examination Report for International Application No. PCT/US02/06185 (Jan. 30, 2007).
Final Office Action for U.S. Appl. No. 10/308,316 (Jan. 23, 2007).
Non-Final Official Action for U.S. Appl. No. 10/308,316 (May 8, 2006).
Supplemental Notice of Allowability for U.S. Appl. No. 09/908,753 (Mar. 22, 2006).
Notice of Allowance and Fee(s) Due for U.S. Appl. No. 10/234,924 (Jan. 17, 2006).
Notice of Allowance and Fee(s) Due for U.S. Appl. No. 09/908,753 (Dec. 21, 2005).
Non-Final Office Action for U.S. Appl. No. 09/908,753 (Jun. 28, 2005).
Official Action for U.S. Appl. No. 10/234,924 (May 23, 2005).
Official Action for U.S. Appl. No. 10/234,924 (Aug. 13, 2004).
International Search Report for International Application No. PCT/US03/27767 (Jan. 28, 2004).
Official Action for U.S. Appl. No. 10/234,924 (Nov. 18, 2003).
Notification of Transmittal of International Preliminary Examination Report for International Application No. PCT/US02/06185 (Feb. 21, 2003).
Notification of Trnamittal of the International Search Report or the Declaration for International Application No. PCT/US02/06185 (Jul. 16, 2002).
"Signaling Transfer Point Generic Requirements," GR-82-Core, Issue 4 (Dec. 1999).
CCS#7 Networks Dependability Studies: Phase 2, Network Integrity Aspects and Qualification Techniques—Restart Procedure and Line Oscillation, vol. 1 of 3: Main Report dated Aug. 1998 (38 pages).
CCS#7 Networks Dependability Studies: Phase 2, Network Integrity Aspects and Qualification Techniques—Restart Procedure and Link Oscillation, vol. 2 of 3: Annex A—Detailed Analysis, dated Aug. 1998 (98 pages).
CCS#7 Networks Dependability Studies: Phase 2, Network Integrity Aspects and Qualification Techniques— Restart Procedure and Link Oscillation, vol. 3 of 3: Annex B—Test Suite Production, dated Aug. 1998 (140 pages).
CCS#7 Networks Dependability Studies: Phase 2,Network Integrity Aspects and Qualification Techniques, dated Aug. 1998 (33 pages).
CCS#7 Networks Dependability Studies: Phase 2, Network Integrity Aspects and Qualification Techniques—Congestion Control and Failure Propagation, vol. 3 of 3: Annex B, July 1998 (138 pages).
CCS#7 Networks Dependability Studies: Phase 2, Network Integrity Aspects and Qualification Techniques—Access Control, vol. 1 of 3: Main Core, dated Jun. 1998, (37 pages).
CCS#7 Networks Dependability Studies: Phase 2, Network Integrity Aspects and Qualification Techniques—Access Control, vol. 2 of 3: Annex A—Protocol Analysis in Access Control, dated Jun. 1998 (44 pages).
CCS#7 Networks Dependability Studies: Phase 2, Network Integrity Aspects and Qualification Techniques—Access Control, vol. 3 of 3: Annex B—Test Suite for Access Control dated June 1998 (50 pages).

* cited by examiner

METHODS, SYSTEMS, AND COMPUTER PROGRAM PRODUCTS FOR DETECTING AND MITIGATING DENIAL OF SERVICE ATTACKS IN A TELECOMMUNICATIONS SIGNALING NETWORK

TECHNICAL FIELD

The subject matter described herein relates to methods, systems, and computer program products for enhancing security in telecommunications signaling networks. More particularly, the subject matter described herein relates to methods, systems, and computer program products for detecting and mitigating denial of service attacks in telecommunications signaling networks.

BACKGROUND ART

In Internet protocol networks, such as the Internet, denial of service attacks are common methods by which attackers render useless a resource that is connected to the network by flooding the resource with packets from the same source or from different sources. For example, a denial of service attack on a server may include repeatedly sending TCP connection requests to a server. If the volume of connection requests per unit time exceeds the capacity of the server, the server will become overloaded in processing the connection requests and will be unable to provide service to legitimate clients. Such attacks have resulted in the unavailability of known e-commerce websites.

In light of the denial of service attacks that have been conducted over the Internet, firewall mechanisms have been created. In its simplest form, a firewall rule set that prevents a denial of service attack may include a rule that blocks all packets from the source of the denial of service attack, once the attack has been detected and the source has been identified. Distributed denial of service attacks are more difficult to detect or prevent because the packets used in the attack originate from multiple sources.

While DoS detection and firewall mechanisms have been implemented to protect e-commerce servers in the Internet, such mechanisms have typically not been implemented in telecommunications signaling networks because the networks have traditionally been closed. That is, because it has been difficult for outsiders to gain physical access to the telecommunications signaling network, such networks lack signaling message security mechanisms. However, with the advent of IP telephony and the opening of traditionally closed networks to signaling traffic from other carriers, physical security has become inadequate. As a result, attackers can gain access to signaling channels used to establish and tear down calls, making telecommunications signaling networks vulnerable to attacks, such as denial of service attacks.

Accordingly, there exists a long felt need for improved methods, systems, and computer program products for detecting and mitigating denial of service attacks in telecommunications signaling networks.

DISCLOSURE OF THE INVENTION

According to one aspect of the subject matter described herein, a method for detecting and mitigating a denial of service attack is provided. The method may include collecting per link traffic rate information for at least two signaling links a telecommunications signaling network. Next, it is determined whether traffic on one of the links exceeds traffic on another of the links by a predetermined threshold. If the traffic on one of the links exceeds the traffic on the other link by the predetermined threshold, a denial of service event is indicated. The denial of service event may be signaled to an operator. The operator may perform a mitigating action, such as configuring a firewall to block packets from a particular source or on a particular link.

The functionality described herein for detecting and mitigating a denial of service attack in a telecommunications signaling network may be implemented using a computer program product comprising computer executable instructions embodied in a computer readable medium. Exemplary computer readable media suitable for use with embodiments of the subject matter described herein include disk storage media, such as optical and magnetic disks, chip memory devices, programmable logic devices, and application specific integrated circuits.

BRIEF DESCRIPTION OF THE DRAWINGS

Preferred embodiments of the subject matter described herein will now be explained with reference to the accompanying drawings of which.

DETAILED DESCRIPTION OF THE INVENTION

Figure 1:
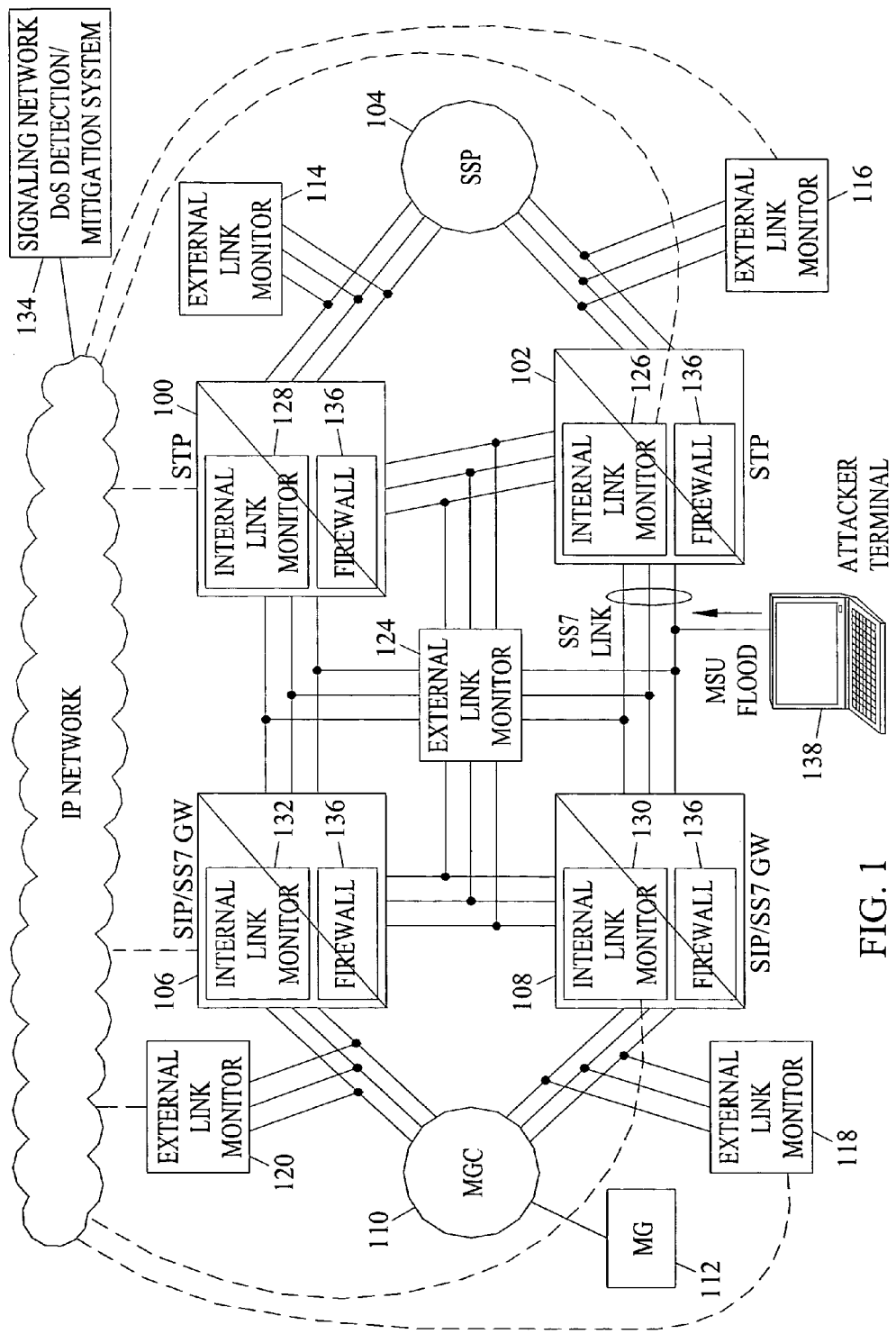
FIG. 1 is a network diagram illustrating signaling link monitors and a signaling network DoS detection/mitigation system according to an embodiment of the subject matter described herein.

The subject matter described herein includes methods, systems, and computer program products for detecting and mitigating a denial of service attack in the telecommunications signaling network. FIG. 1 illustrates an exemplary telecommunications signaling network and a system for detecting and mitigating a denial of service attack according to an embodiment of the subject matter described herein. Referring to FIG. 1, the telecommunications signaling network includes both conventional SS7 signaling entities and IP telephony signaling entities. In the illustrated example, the SS7 signaling entities include signal transfer points 100 and 102 and service switching point 104. Signal transfer points 100 and 102 route signaling messages between SS7 destinations. Service switching point 104 connects end users to the telecommunications network and performs the signaling necessary to establish and tear down calls.

The IP telephony components of the network illustrated in FIG. 1 include SIP/SS7 gateways 106 and 108, media gateway controller 110, and media gateway 112. SIP/SS7 gateways 106 and 108 convert between SIP and SS7 protocols and route signaling messages between SIP and SS7 network entities. Media gateway controller 110 controls one or more media gateways, such as media gateway 112, to provide IP telephony service to subscribers.

In addition to the SIP and IP telephony components, the network illustrated in FIG. 1 includes link monitoring and firewall filtering components. In the illustrated example, external link monitors 114, 116, 118, 120, and 124 are connected to the signaling links that interconnect the various SS7 and IP telephony network entities to copy signaling messages that traverse the signaling links. In addition, or in the alternative, STPs 100 and 102 and SIP/SS7 gateways 106 and 108 may include internal link monitors 126, 128, 130, and 132 for copying signaling messages that traverse the link interfaces within each component. Examples of external and internal link monitors suitable for use with the embodiments of the subject matter described herein are provided in commonly-assigned, co-pending U.S. patent publication no. 20040233851, the disclosure of which is incorporated herein by reference in its entirety. Briefly, the internal link monitors include message copy functions that copy signaling messages that arrive at each link interface module in a signaling node, such as a signal transfer point. The signaling message copies are forwarded over a TCP/IP connection via a network interface in each node to a set of network monitoring processors coupled to the signaling node. The network monitoring processors forward the message copies to a site collector. The site collectors are computers that collect and store message copies from each network data collection site and forward the message copies to a data gateway server that formats the messages for various applications. The site collectors may also be configured to generate peg counters, which count messages that match user-specified criteria.

External link monitors 114, 116, 118, and 120 function similarly to the internal link monitors in that they copy messages and forward messages to network monitoring site collectors that collect messages from each network monitoring site. The primary difference between the external link monitors and the internal link monitors is that the external link monitors include link probes that attach to signaling links outside of the nodes being monitored.

In FIG. 1, a denial of service detection/mitigation system 134 detects denial of service events and performs mitigating actions. Denial of service detection/mitigation system 134 may detect and mitigate denial of service attacks that utilize any type of signaling messages in a telecommunications network. Examples of such signaling messages include SS7 signaling messages, including TDM-based SS7 signaling messages and SS7 over IP signaling messages, IP telephony signaling messages, or any other type of message that may traverse a telecommunications signaling network. Additional details of DoS detection/mitigation system 134 will be provided below.

In order to guard against network security threats, each signaling node may include a firewall function 136. Each firewall function 136 may screen signaling messages according to rules that are configured by the network operator. In one implementation, firewall functions 136 may be implemented as part of gateway screening that occurs at inbound link interface modules in telecommunications signaling nodes, such as nodes 100, 102, 106, and 108. An example of firewall filtering functionality that can be provided in a telecommunications signaling node is described in commonly-assigned, co-pending U.S. patent publication no. 20040042609, the disclosure of which is incorporated herein by reference in its entirety. Briefly, this publication indicates that firewall functionality may be provided at the network interface card level whereby incoming messages are screened to determine whether the source address in the messages match the link on which the messages are received. According to an embodiment of the subject matter described herein, firewall functions 136 illustrated in FIG. 1 may also include rules that block messages from a particular source based on DoS data collected by DoS detection/mitigation system 134.

In FIG. 1, an attacker using attacker terminal 138 may gain access to one or more signaling links in a signaling linkset, but less than all of the signaling links, because the signaling links may be physically separate from each other. Once the attacker gains access to one of the signaling links, the attacker can send a signaling message flood over the signaling links to disable any of the nodes connected to the signaling link.

Figure 2:
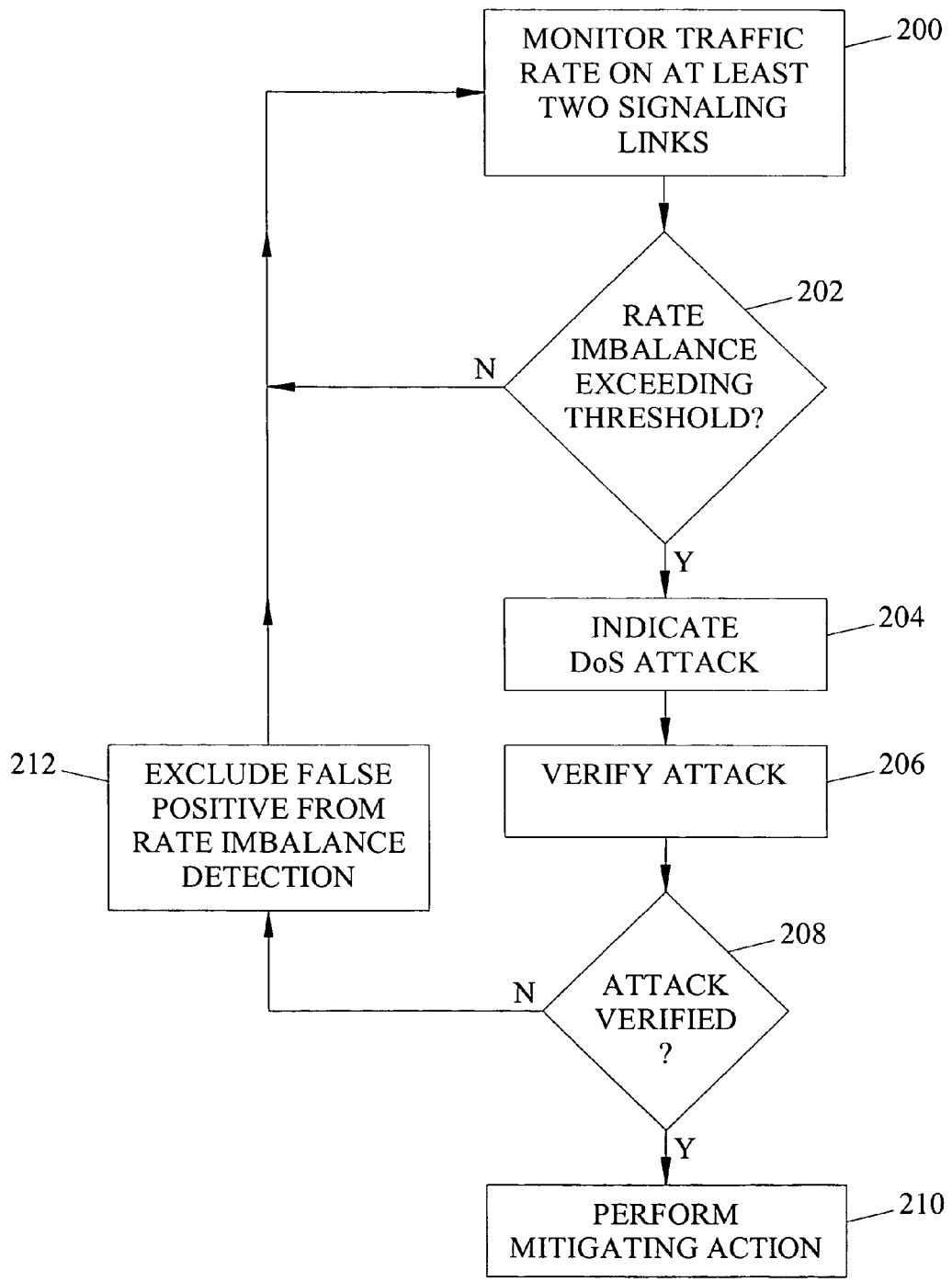
FIG. 2 is a flow chart illustrating exemplary steps for detecting and mitigating a denial of service attack according to an embodiment of the subject matter described herein.

According to an embodiment of the subject matter described herein, a denial of service attack may be indicated by an increased traffic rate on one signaling link relative to the other signaling links in a group or linkset. FIG. 2 is a flow chart illustrating exemplary steps for detecting a denial of service attack on a signaling link according to an embodiment of the subject matter described herein. Referring to FIG. 2, in step 200, the traffic rate is monitored on at least two signaling links interconnecting a pair of nodes. The signaling links may be part of the same linkset. In one exemplary implementation, traffic rate information for all links interconnecting two nodes is collected. In step 202, it is determined whether a rate imbalance exists between one signaling link and any of the other signaling links being monitored. For example, the traffic rate for each signaling link may be determined by counting the number of signaling messages that traverse the signaling link per unit time. The traffic rate on a given signaling link may be compared to all of the other signaling links or to an average traffic rate of the other signaling links. If the rate on the one signaling link exceeds the rate on the remaining signaling links by a predetermined threshold, control proceeds to step 204 where a denial of service attack is indicated. Indicating a denial of service attack may include generating an alarm informing the network operator that a denial of service attack on a signaling link is occurring.

In step 206, the operator may verify the attack. For example, if the signaling link is being tested and a large number of messages are being sent over the link during the test, a denial of service attack may not be occurring. As another example of determining whether a signaling link loading imbalance is due to an attack or is a false positive, it may be desirable to determine whether any of the links being compared have failed. For example, if a link fails, there will be no traffic on the link. This may result in a load imbalance being detected relative to other links and thus a false positive. In SS7 networks, link failure may be determined by the absence of any message traffic, including FISU and LSSU message traffic. Accordingly, if a link load imbalance is detected and one of the links being compared has no LSSU or FISU traffic, the denial of service attack may be determined to be a false positive. In another example, a link may be manually taken out of service for testing. In some tests, LSSU messages may be sent over the link. In such an example, the status field in each LSSU can be examined to determine whether the link is currently being tested. Accordingly, in step 208, the user determines whether the attack is valid. If the attack is valid, control proceeds to step 210 where a mitigating action is performed. Performing a mitigating action may include populating firewall functions 136 on the nodes connected to the signaling link with an entry that blocks packets associated with the source or sources of the denial of service attack. In step 208, if the attack is not valid, control proceeds to step 212 where the false positive is excluded from rate imbalance detection. Excluding the false positive may include adding logic to DoS detection/mitigation system 134 that ignores packets having the particular source address on the links being monitored.

Figure 3:
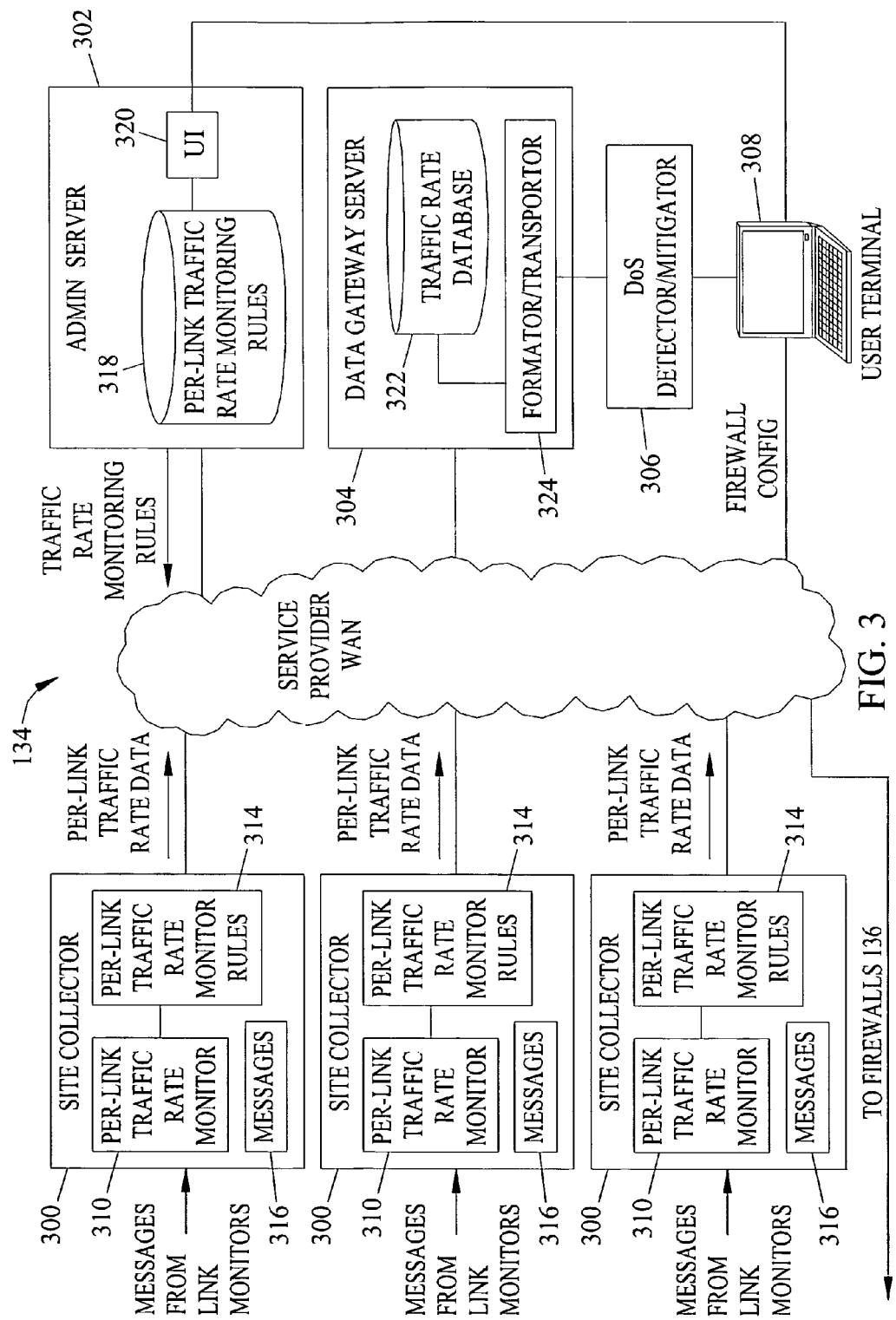
FIG. 3 is a block diagram illustrating exemplary components of a system for detecting and mitigating a denial of service attack according to an embodiment of the subject matter described herein.

FIG. 3 is a block diagram illustrating DoS detection/mitigation system 134 in more detail. Referring to FIG. 3, DoS detection/mitigation system includes a plurality of site collectors 300 that collect messages from the link monitors, an administration server 302 that configures the site collectors to apply per link traffic rate monitors, a data gateway server 304 that receives per link traffic rate information, a DoS detector/ mitigator 306 that detects and mitigates denial of service events based on the rate information, and a user terminal for controlling the overall operation of the system. Each site collector 300 includes a per link traffic rate monitor 310 that monitors traffic on a signaling link based on monitoring rules 314 and message database 316. For example, per link traffic rate monitor 310 may count messages that traverse a particular link. Per link traffic rate monitor 310 may calculate a traffic rate for a particular link by dividing the number of messages that traverse that link by the time period defined by the earliest and latest timestamps in the messages. Per link traffic rate monitor rules 314 may provide rules for counting messages, such as rules that specify on which links messages should be counted and the time periods for each count. For example, per link traffic rate monitor rules 314 may exclude some signaling links if testing is being performed on these links. Message database 316 may store messages that traverse each link for a predetermined time period. Administration server 302 includes per link traffic rate monitoring rules database 318 and a user interface 320. Per link traffic rate monitoring rules database 318 contains the master set of rules generated by the user that are distributed to site collectors 300. User interface 320 may be a web interface or any other terminal interface that allows user terminal 308 to define per link traffic rate monitoring rules.

Data gateway server 304 collects per link traffic rate data from site collectors 300. Data gateway server 304 stores this information in traffic rate database 322. A formatter/transporter 324 delivers the traffic rate information to an application, such as DoS detector/mitigator 306. DoS detector/mitigator 306 performs the functions illustrated in FIG. 2 for determining whether a per link denial of service event has occurred. If a per link denial of service event has occurred, DoS detector/mitigator 306 may generate an alarm to the user via user terminal 308. DoS detector/mitigator 306 may also generate a DoS report including copies of messages and traffic statistics, such as the traffic rates on different signaling links. The user may use this information to determine whether the attack is valid or due to a normal cause, such as link testing. If the user determines that the attack is valid, the user may take the appropriate mitigating action, such as sending firewall configuration information to firewalls 136 to block the attack packets.

Thus, by analyzing traffic rate information on a per link basis and comparing the utilization of one link to that of another link, denial of service attacks on signaling links can be detected. In addition, further attacks can be mitigated by populating the appropriate firewall tables in a signaling node.

It will be understood that various details of the invention may be changed without departing from the scope of the invention. Furthermore, the foregoing description is for the purpose of illustration only, and not for the purpose of limitation, as the invention is defined by the claims as set forth hereinafter.

What is claimed is:

1. A method for detecting and mitigating a denial of service (DoS) attack in a telecommunications signaling network, the method comprising:
   (a) collecting per link traffic rate information for a plurality of signaling links in a telecommunications signaling network;
   (b) determining whether a traffic rate on a first signaling link of the plurality of signaling links exceeds a traffic rate on at least a second signaling link of the plurality of signaling links by a predetermined threshold, wherein the traffic rate on a signaling link includes a total number of signaling messages that traverse the signaling link during a time period, the first and second signaling links are members of the same signaling linkset that interconnects a pair of telecommunications network signaling nodes and determining whether the traffic rate on the first signaling link exceeds the traffic rate on at least the second signaling link includes comparing the traffic rate on the first signaling link to the traffic rate on the second signaling link; and
   (c) in response to determining that the traffic rate on the first signaling link exceeds the traffic rate on the second signaling link by a predetermined threshold, indicating a denial of service attack caused by an attacker gaining access to the first signaling link but not the second signaling link.

2. The method of claim 1 wherein collecting per link traffic rate information includes collecting signaling system 7 (SS7) traffic rate information for a plurality of SS7 signaling links.

3. The method of claim 2 wherein the plurality of SS7 signaling links includes time division multiplexed (TDM)-based SS7 signaling links.

4. The method of claim 2 wherein the SS7 signaling links includes SS7 over Internet protocol (IP) signaling links.

5. The method of claim 1 wherein collecting per link traffic rate information includes collecting per link traffic rate information for a plurality of Internet protocol (IP) telephony signaling links.

6. The method of claim 1 wherein determining whether the traffic rate on the first signaling link exceeds the traffic rate on the second signaling link by a predetermined threshold includes comparing a measured traffic rate on the first signaling link to a measured traffic rate on the second signaling link.

7. The method of claim 1 wherein indicating a denial of service attack includes sending a denial of service alarm to an operator.

8. The method of claim 1 wherein indicating a denial of service attack includes generating a report including at least one packet in the denial of service attack.

9. The method of claim 1 comprising in response to detecting a denial of service attack, performing a mitigating action.

10. The method of claim 9 wherein performing a mitigating action includes configuring firewalls in network signaling nodes to block packets associated with the denial of service attack.

11. The method of claim 1 comprising determining whether the denial of service attack is valid.

12. The method of claim 11 comprising, in response to determining that the denial of service attack is not valid, indicating that the denial of service attack is a false positive.

13. A system for detecting and mitigating a denial of service attack in a telecommunications signaling network, the system comprising:
   (a) a data gateway server for collecting per link traffic rate information for at least first and second signaling links in a network; and
   (b) a denial of service detector/mitigator for receiving and analyzing the per link traffic rate information and determining whether the rate information the first signaling link exceeds the traffic rate the second signaling link by a predetermined threshold, and, in response to determining that the traffic rate on the first signaling link exceeds the traffic rate on the second signaling link by the predetermined threshold, for indicating a denial of service attack caused by an attacker gaining access to the first signaling link but not the second signaling link, wherein the traffic rate on a signaling link includes a total number of messages that traverse the signaling link during a time period, the first and second signaling links are members of the same signaling linkset that interconnects a pair of telecommunications network signaling nodes and determining whether the traffic rate on the first signaling link exceeds the traffic rate on the second signaling link includes comparing the traffic rate on the first signaling link to the traffic rate on the second signaling link.

14. The system of claim 13 wherein the data gateway server is adapted to collect traffic rate information for a plurality of signaling system 7 (SS7) signaling links.

15. The system of claim 14 wherein the SS7 signaling links include time division multiplexed (TDM)-based SS7 signaling links.

16. The system of claim 14 wherein the SS7 signaling links includes SS7 over Internet protocol (IP) signaling links.

17. The system of claim 13 wherein the data gateway server is adapted to collect traffic rate information for a plurality of Internet protocol (IP) telephony signaling links.

18. The system of claim 13 wherein the DoS detector/mitigator is adapted to generate an alarm to an operator in response to detecting a denial of service attack.

19. The system of claim 18 comprising a user terminal for receiving the alarm and allowing the user to verify the denial of service attack.

20. The system of claim 19 wherein the user terminal is operatively coupled to at least one firewall, wherein, in response to verifying the denial of service attack, the user terminal is adapted to update the firewall with data for mitigating the denial of service attack in response to input from the user.

21. The system of 19 wherein the user terminal is adapted to receive input from the user regarding a false positive attack and for updating the DoS detector/mitigator to exclude the false positive from DoS attack detection.

22. A non-transitory computer-readable medium containing a program which, when executed by a processor of a computer, controls the computer to perform steps comprising:
(a) collecting per link traffic rate information for a plurality of signaling links in a signaling network;
(b) determining whether a traffic rate on at least a first signaling link of the plurality of signaling links exceeds a traffic rate on at least a second signaling link of the plurality of signaling links by a predetermined threshold; and
(c) in response to determining that the traffic rate on the first signaling link exceeds the traffic rate on the second signaling link by a predetermined threshold, indicating a denial of service attack caused by an attacker gaining access to the first signaling link but not the second signaling link, wherein the traffic rate on a signaling link includes a total number of messages that traverse the signaling link during a time period, the first and second signaling links are members of the same signaling linkset that interconnects a pair of telecommunications network signaling nodes and determining whether the traffic rate on the first signaling link exceeds the traffic rate on at least the second signaling link includes comparing the traffic rate on the first signaling link to the traffic on the second signaling link.

23. The non-transitory computer-readable medium of claim 22 wherein collecting per link traffic rate information includes collecting signaling system 7 (SS7) traffic rate information for a plurality of SS7 signaling links.

24. The non-transitory computer-readable medium of claim 23 wherein the plurality of SS7 signaling links includes time division multiplexed (TDM)-based SS7 signaling links.

25. The non-transitory computer-readable medium of claim 23 wherein the SS7 signaling links includes SS7 over Internet protocol (IP) signaling links.

26. The non-transitory computer-readable medium of claim 22 wherein collecting per link traffic rate information includes collecting per link traffic rate information for a plurality of Internet protocol (IP) telephony signaling links.

27. The non-transitory computer-readable medium of claim 22 wherein determining whether the traffic rate on the first signaling link exceeds the traffic rate on the second signaling link by a predetermined threshold includes comparing a measured traffic rate on the first signaling link to a measured traffic rate on the second signaling link.

28. The non-transitory computer-readable storage of claim 22 wherein indicating a denial of service attack includes sending a denial of service alarm to an operator.

29. The non-transitory computer-readable storage of claim 22 wherein indicating a denial of service attack includes generating a report including information regarding at least one packet in the denial of service attack.

30. The non-transitory computer-readable storage of claim 22 comprising, in response to detecting a denial of service attack, performing a mitigating action.

31. The non-transitory computer-readable storage of claim 30 wherein performing a mitigating action includes configuring firewalls in network signaling nodes to block packets associated with the denial of service attack.

32. The non-transitory computer-readable storage of claim 22 comprising determining whether the denial of service attack is valid.

33. The non-transitory computer-readable storage of claim 32 comprising, in response to determining that the denial of service attack is not valid, indicating that the denial of service attack is a false positive.

* * * * *